United States Patent
Hains et al.

(10) Patent No.: US 10,344,186 B2
(45) Date of Patent: Jul. 9, 2019

(54) POLISHING COMPOSITION COMPRISING AN AMINE-CONTAINING SURFACTANT

(71) Applicant: Cabot Microelectronics Corporation, Aurora, IL (US)

(72) Inventors: Alexander W. Hains, Aurora, IL (US); Tina Li, Warrenville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 196 days.

(21) Appl. No.: 15/629,487

(22) Filed: Jun. 21, 2017

(65) Prior Publication Data

US 2017/0369742 A1 Dec. 28, 2017

Related U.S. Application Data

(60) Provisional application No. 62/353,163, filed on Jun. 22, 2016.

(51) Int. Cl.
*B24B 37/04* (2012.01)
*C09G 1/02* (2006.01)
*C09K 3/14* (2006.01)

(52) U.S. Cl.
CPC .............. *C09G 1/02* (2013.01); *B24B 37/044* (2013.01); *C09K 3/1409* (2013.01); *C09K 3/1463* (2013.01)

(58) Field of Classification Search
CPC .. B24B 37/044; C09K 3/1409; C09K 3/1463; C09K 13/00; H01L 21/30625; H01L 21/31051; H01L 21/3212; C09G 1/02

USPC ....... 451/41; 252/79.1; 216/88, 89; 438/692, 438/693

See application file for complete search history.

(56) References Cited

U.S. PATENT DOCUMENTS

| | | | |
|---|---|---|---|
| 5,856,379 A * | 1/1999 | Shiratsuchi | C08K 3/36 428/403 |
| 6,242,351 B1 | 6/2001 | Li et al. | |
| 7,056,192 B2 * | 6/2006 | Venigalla | C09G 1/02 257/E21.244 |
| 7,199,056 B2 * | 4/2007 | Ko | C09G 1/02 257/E21.23 |
| 7,677,956 B2 * | 3/2010 | Carter | B24B 37/0056 451/28 |
| 8,043,970 B2 * | 10/2011 | Lee | C09G 1/02 438/691 |
| 8,822,340 B2 | 9/2014 | Babu et al. | |
| 8,980,113 B2 | 3/2015 | Wang et al. | |
| 9,305,806 B2 | 4/2016 | Shi et al. | |
| 2006/0099577 A1 * | 5/2006 | Merk | C12N 15/10 435/6.11 |

(Continued)

*Primary Examiner* — George B Nguyen
(74) *Attorney, Agent, or Firm* — Thomas Omholt; Erika S. Wilson; Benjamin F. Strick (57) ABSTRACT

The invention provides a chemical-mechanical polishing composition comprising (a) wet-process ceria abrasive, (b) a surfactant comprising an amine-containing anchor group and ethylene oxide-propylene oxide stabilizing group, wherein the surfactant has a molecular weight of from about 1000 Daltons to about 5000 Daltons, (c) an aromatic carboxylic acid or heteroaromatic carboxylic acid, and (d) water, wherein the polishing composition has a pH of about 3 to about 6. The invention further provides a method of chemically mechanically polishing a substrate with the inventive chemical-mechanical polishing composition. Typically, the substrates contain silicon oxide.

19 Claims, 8 Drawing Sheets

(56) References Cited

U.S. PATENT DOCUMENTS

| | | | |
|---|---|---|---|
| 2006/0108326 A1* | 5/2006 | Dysard | C09G 1/02 |
| | | | 216/88 |
| 2013/0137344 A1* | 5/2013 | Liu | B24B 7/228 |
| | | | 451/41 |
| 2013/0244433 A1* | 9/2013 | Reiss | C09G 1/02 |
| | | | 438/693 |
| 2014/0346140 A1* | 11/2014 | Dockery | B24B 37/044 |
| | | | 216/38 |

* cited by examiner

POLISHING COMPOSITION COMPRISING AN AMINE-CONTAINING SURFACTANT

BACKGROUND OF THE INVENTION

In the fabrication of integrated circuits and other electronic devices, multiple layers of conducting, semiconducting, and dielectric materials are deposited onto or removed from a substrate surface. As layers of materials are sequentially deposited onto and removed from the substrate, the uppermost surface of the substrate may become non-planar and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization also is useful in forming features on a substrate by removing excess deposited material used to fill the features and to provide an even surface for subsequent levels of metallization and processing.

Compositions and methods for planarizing or polishing the surface of a substrate are well known in the art. Chemical-mechanical planarization, or chemical-mechanical polishing (CMP), is a common technique used to planarize substrates. CMP utilizes a chemical composition, known as a CMP composition or a polishing composition (also referred to as a polishing slurry), for selective removal of material from the substrate. Polishing compositions typically contain an abrasive material in a liquid carrier along with other chemical components and are applied to a surface by contacting the surface with a rotating polishing pad saturated with the polishing composition. The polishing of the substrate typically is further aided by the chemical activity of the polishing composition and/or the mechanical activity of an abrasive suspended in the polishing composition or incorporated into the polishing pad (e.g., fixed abrasive polishing pad). In some instances, the chemical components may also promote removal of material.

As the size of integrated circuits is reduced and the number of integrated circuits on a chip increases, the components that make up the circuits must be positioned closer together in order to comply with the limited space available on a typical chip. Effective isolation between circuits is important for ensuring optimum semiconductor performance. To that end, shallow trenches are etched into the semiconductor substrate and filled with insulating material to isolate active regions of the integrated circuit. More specifically, shallow trench isolation (STI) is a process in which a silicon nitride layer is formed on a silicon substrate, shallow trenches are formed via etching or photolithography, and a dielectric layer is deposited to fill the trenches. Due to variation in the depth of trenches formed in this manner, it is typically necessary to deposit an excess of dielectric material on top of the substrate to ensure complete filling of all trenches. The dielectric material (e.g., a silicon oxide) conforms to the underlying topography of the substrate. Thus, the surface of the substrate is characterized by raised areas of the overlying oxide between trenches, which are referred to as pattern oxide. Pattern oxide is characterized by the step height of the excess dielectric material lying outside of the trenches. The excess dielectric material is typically removed by a CMP process, which additionally provides a planar surface for further processing. As pattern oxide is abraded and planarity of the surface is approached, the oxide layer is then referred to as blanket oxide.

A polishing composition can be characterized according to its polishing rate (i.e., removal rate) and its planarization efficiency. The polishing rate refers to the rate of removal of a material from the surface of the substrate and is usually expressed in terms of units of length (thickness) per unit of time (e.g., Angstroms (Å) per minute). Planarization efficiency relates to step height reduction versus trench loss, or the amount of material removed from the substrate. Specifically, a polishing surface, e.g., a polishing pad, first contacts the "high points" of the surface and must remove material in order to form a planar surface. A process that results in achieving a planar surface with lowest trench loss is considered to be more efficient than a process requiring removal of more material to achieve planarity.

Often the rate of removal of the silicon oxide pattern can be rate-limiting for the dielectric polishing step in STI processes, and therefore high removal rates of the silicon oxide pattern are desired to increase device throughput. However, if the blanket removal rate is too rapid, overpolishing of oxide in exposed trenches can result in trench erosion, loss of silicon nitride, and increased device defectivity. Thus, a polishing composition with a rapid removal rate does not inherently produce satisfactory planarization efficiency.

A need remains for compositions and methods for chemical-mechanical polishing of silicon substrates, especially silicon oxide-containing substrates that will provide useful removal rates while also providing improved planarization efficiency. The invention provides such polishing compositions and methods. These and other advantages of the invention, as well as additional inventive features, will be apparent from the description of the invention provided herein.

BRIEF SUMMARY OF THE INVENTION

The invention provides a chemical-mechanical polishing composition comprising (a) wet-process ceria abrasive, (b) a surfactant comprising an amine-containing anchor group and ethylene oxide-propylene oxide stabilizing group, wherein the surfactant has a molecular weight of from about 1000 Daltons to about 5000 Daltons, (c) an aromatic carboxylic acid or heteroaromatic carboxylic acid, and (d) water, wherein the polishing composition has a pH of about 3 to about 6.

The invention also provides a method of chemically mechanically polishing a substrate comprising (i) providing a substrate, (ii) providing a polishing pad, (iii) providing a chemical-mechanical polishing composition comprising (a) wet-process ceria, (b) a surfactant comprising an amine-containing anchor group and ethylene oxide-propylene oxide stabilizing group, wherein the surfactant has a molecular weight of from about 1000 Daltons to about 5000 Daltons, (c) an aromatic carboxylic acid or heteroaromatic carboxylic acid, and (d) water, wherein the polishing composition has a pH of about 3 to about 6, (iv) contacting the substrate with the polishing pad and the chemical-mechanical polishing composition, and (v) moving the polishing pad and the chemical-mechanical polishing composition relative to the substrate to abrade at least a portion of a surface of the substrate to polish the substrate.

DETAILED DESCRIPTION OF THE INVENTION

The invention provides a chemical-mechanical polishing composition comprising, consisting essentially of, or consisting of (a) wet-process ceria abrasive, (b) a surfactant comprising an amine-containing anchor group and ethylene oxide-propylene oxide stabilizing group, wherein the surfactant has a molecular weight of from about 1000 Daltons to about 5000 Daltons, (c) an aromatic carboxylic acid or heteroaromatic carboxylic acid, and (d) water, wherein the polishing composition has a pH of about 3 to about 6.

The chemical-mechanical polishing composition comprises a ceria abrasive. As is known in the art, ceria is an oxide of the rare earth metal cerium, and is known as ceric oxide, cerium oxide (e.g., cerium(IV) oxide), or cerium dioxide. Cerium(IV) oxide ($CeO_2$) can be formed by calcining cerium oxalate or cerium hydroxide. Cerium also forms cerium(III) oxides such as, for example, $Ce_2O_3$. The ceria abrasive can be any one or more of these or other oxides of ceria.

The ceria abrasive can be of any suitable type. As used herein, "wet-process" ceria refers to a ceria prepared by a precipitation, condensation-polymerization, or similar process (as opposed to, for example, fumed or pyrogenic ceria). An illustrative wet-process ceria is HC-60™ ceria commercially available from Rhodia Inc. (Cranbury, N.J.). Another illustrative wet-process ceria is described in a co-pending application, U.S. patent application Ser. No. 15/056,198.

The wet-process ceria particles can be made by any suitable process. In an embodiment, wet-process ceria particles can be prepared by first dissolving a ceria precursor in water. The ceria precursor can be any suitable ceria precursor, and can include a ceria salt having any suitable charge, e.g., $Ce^{3+}$ or $Ce^{4+}$. Suitable ceria precursors include, for example, cerium(III) nitrate, cerium(IV) ammonium nitrate, cerium(III) carbonate, cerium(IV) sulfate, and cerium(III) chloride. Preferably, the ceria precursor is cerium(III) nitrate.

The ceria particles can have any suitable average size (i.e., average particle diameter). If the average ceria particle size is too small, the polishing composition may not exhibit sufficient removal rate. In contrast, if the average ceria particle size is too large, the polishing composition may exhibit undesirable polishing performance such as, for example, poor substrate defectivity. Accordingly, the ceria particles can have an average particle size of about 10 nm or more, for example, about 15 nm or more, about 20 nm or more, about 25 nm or more, about 30 nm or more, about 35 nm or more, about 40 nm or more, about 45 nm or more, or about 50 nm or more. Alternatively, or in addition, the ceria can have an average particle size of about 1,000 nm or less, for example, about 750 nm or less, about 500 nm or less, about 250 nm or less, about 150 nm or less, about 100 nm or less, about 75 nm or less, or about 50 nm or less. Thus, the ceria can have an average particle size bounded by any two of the aforementioned endpoints. For example, the ceria can have an average particle size of about 10 nm to about 1,000 nm, about 10 nm to about 750 nm, about 15 nm to about 500 nm, about 20 nm to about 250 nm, about 20 nm to about 150 nm, about 25 nm to about 150 nm, about 25 nm to about 100 nm, or about 50 nm to about 150 nm, or about 50 nm to about 100 nm. For non-spherical ceria particles, the size of the particle is the diameter of the smallest sphere that encompasses the particle. The particle size of the ceria can be measured using any suitable technique, for example, using laser diffraction techniques. Suitable particle size measurement instruments are available from e.g., Malvern Instruments (Malvern, UK).

The ceria particles preferably are colloidally stable in the inventive polishing composition. The term colloid refers to the suspension of ceria particles in the liquid carrier (e.g., water). Colloidal stability refers to the maintenance of that suspension through time. In the context of this invention, an abrasive is considered colloidally stable if, when the abrasive is placed into a 100 mL graduated cylinder and allowed to stand unagitated for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the initial concentration of particles in the abrasive composition ([C] in terms of g/mL) is less than or equal to 0.5 (i.e., {[B]−[T]}/[C]≤0.5). More preferably, the value of [B]−[T]/[C] is less than or equal to 0.3, and most preferably is less than or equal to 0.1.

The polishing composition can comprise any suitable amount of ceria abrasive. If the polishing composition of the invention comprises too little ceria abrasive, the composition may not exhibit sufficient removal rate. In contrast, if the polishing composition comprises too much ceria abrasive, the polishing composition may exhibit undesirable polishing performance and/or may not be cost effective and/or may lack stability. The polishing composition can comprise about 10 wt. % or less of ceria, for example, about 9 wt. % or less, about 8 wt. % or less, about 7 wt. % or less, about 6 wt. % or less, about 5 wt. % or less, about 4 wt. % or less, about 3 wt. % or less, about 2 wt. % or less, about 1 wt. % or less, about 0.9 wt. % or less, about 0.8 wt. % or less, about 0.7 wt. % or less, about 0.6 wt. % or less, or about 0.5 wt. % or less. Alternatively, or in addition, the polishing composition can comprise about 0.01 wt. % or more of ceria, for example, about 0.05 wt. % or more, about 0.1 wt. % or more, about 0.2 wt. % or more, about 0.3 wt. % or more, about 0.4 wt. % or more, about 0.5 wt. % or more, or about 1 wt. % or more. Thus, the polishing composition can comprise ceria in an amount bounded by any two of the aforementioned endpoints. For example, the polishing composition can comprise about 0.01 wt. % to about 10 wt. % of ceria, about 0.05 wt. % to about 10 wt. %, about 0.05 wt. % to about 9 wt. %, about 0.05 wt. % to about 8 wt. %, about 0.05 wt. % to about 7 wt. %, about 0.05 wt. % to about 6 wt. %, about 0.05 wt. % to about 5 wt. %, about 0.05 wt. % to about 4 wt. %, about 0.05 wt. % to about 3 wt. %, about 0.05 wt. % to about 2 wt. %, about 0.05 wt. % to about 1 wt. %, about 0.2 wt. % to about 2 wt. %, about 0.2 wt. % to about 1 wt. %, or about 0.3 wt. % to about 0.5 wt. %. In an embodiment, the polishing composition comprises, at point-of-use, about 0.05 wt. % to about 2 wt. % of ceria (e.g., about 0.3 wt. % of ceria).

The polishing composition comprises a surfactant. The surfactant can be any suitable surfactant. Preferably, the polishing composition comprises a surfactant comprising an amine-containing anchor group and ethylene oxide-propylene oxide stabilizing group, wherein the surfactant has an average molecular weight of from about 1000 Daltons to about 5000 Daltons, e.g., about 1500 Daltons, about 2000 Daltons, about 2500 Daltons, about 3000 Daltons, about 3500 Daltons, about 4000 Daltons, or about 4500 Daltons.

In an embodiment, the surfactant is a cationic comb polymer comprising an amine-containing anchor group of the formula:

wherein Ar is a 1,4-disubstituted arylene or and n is an integer from about 2 to about 10, e.g., about 3, about 4, about 5, about 6, about 7, about 8, or about 9. The cationic comb polymer further comprises an ethylene oxide-propylene oxide stabilizing group attached to the backbone nitrogen atom, wherein the ethylene oxide-propylene oxide stabilizing group has the formula: $-(CH(CH_3)CH_2O)_x(CH_2CH_2O)_yCH_3$, wherein x and y are independently selected integers from about 2 to about 25. In a preferred embodiment, the surfactant is Jeffsperse™ X3503, commercially available from Huntsman Corporation (Woodlands, Tex.).

As is well understood in the art, amine functionalized groups are basic and can become protonated depending on the pH of a polishing composition comprising the amine functionalized group. Thus, a surfactant is cationic depending on the pH of the polishing composition. For example, the cationic comb polymer can be considered cationic at pH values of about 2 to about 7, e.g., a pH of about 6, a pH of about 5, a pH of about 4, or a pH of about 3.

In another embodiment, the surfactant comprises one mono((diethylamino)alkyl) ether anchoring group of the formula:

The surfactant further comprises an ethylene oxide-propylene oxide stabilizing group of the formula: $-C_2H_4(OCH_2CH_2)_x(OCH(CH_3)CH_2)_yOH$ wherein x and y are independently selected integers of from about 2 to about 25, wherein the stabilizing group has a ratio of ethylene oxide units to propylene oxide units of about 1:1 to about 1:3, e.g., about 1:2. In a preferred embodiment, the surfactant is Solsperse™ 20000, commercially available from Lubrizol Corporation (Wickliffe, Ohio).

Figure 1:
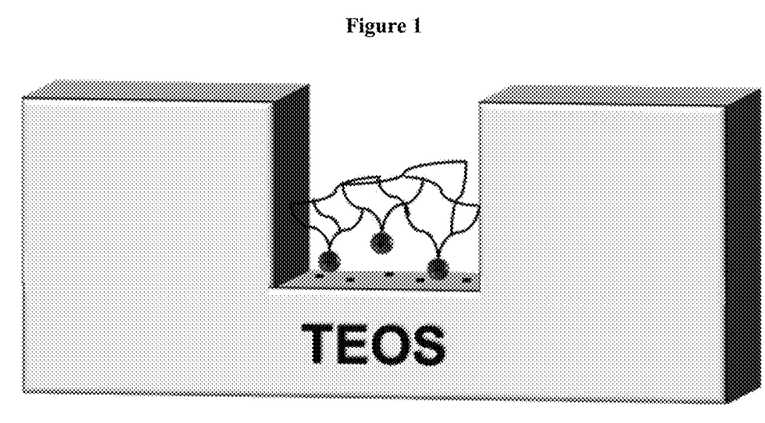
FIG. 1 depicts a comb polymer bound in a trench, providing a protective layer from the polishing pad.

Without wishing to be bound by any particular theory, it is believed that the surfactant rests in the trenches of a substrate being polished to block polishing pad access according to FIG. 1. In addition, the slightly hydrophilic section of the surfactant maintains a Coulombic attraction to the negatively charged tetraethyl orthosilicate (TEOS) surface in the trench, resulting in potential hydrogen bonding. Furthermore, the surfactant inverts the surface potential of the TEOS from negative to positive, reducing the Coulombic attraction to ceria. Thus, the polymeric accumulation in the trenches results in formation of a protective layer, reducing TEOS erosion and increasing planarization efficiency.

The polishing composition can comprise any suitable amount of the surfactant. The polishing composition can comprise about 500 ppm or less of the surfactant, for example, about 400 ppm or less, about 300 ppm or less, about 200 ppm or less, about 100 ppm or less, or about 75 ppm or less. Alternatively, or in addition, the polishing composition can comprise about 10 ppm or more of the surfactant, for example, about 15 ppm or more, about 20 ppm or more, about 25 ppm or more, about 30 ppm or more, about 35 ppm or more, about 40 ppm or more, about 45 ppm or more, or about 50 ppm or more. Thus, the surfactant can be present in the polishing composition in an amount bounded by any two of the aforementioned endpoints. For example, the polishing composition can comprise about 10 ppm to about 500 ppm of the surfactant, for example, about 15 ppm to about 500 ppm, about 20 ppm to about 500 ppm, about 25 ppm to about 500 ppm, about 30 ppm to about 500 ppm, about 35 ppm to about 500 ppm, about 40 ppm to about 500 ppm, about 45 ppm to about 500 ppm, about 50 ppm to about 500 ppm, about 50 ppm to about 400 ppm, about 50 ppm to about 300 ppm, about 50 ppm to about 200 ppm, about 50 ppm to about 100 ppm, about 50 ppm to about 75 ppm, about 10 ppm to about 75 ppm, or about 50 ppm to about 300 ppm.

The polishing composition comprises an aromatic carboxylic acid or heteroaromatic carboxylic acid. The aromatic carboxylic acid or heteroaromatic carboxylic acid can be any suitable aromatic carboxylic acid or heteroaromatic carboxylic acid. Non-limiting examples of aromatic carboxylic acids and heteroaromatic carboxylic acids include benzoic acid, 1,2-benzenedicarboxylic acid, 1,3-benzenedicarboxylic acid, 1,4-benzenedicarboxylic acid, salicylic acid, picolinic acid, dipicolinic acid, and the like. Preferably, the aromatic carboxylic acid or heteroaromatic carboxylic acid is picolinic acid.

The polishing composition can comprise any suitable amount of the aromatic carboxylic acid or heteroaromatic carboxylic acid. The polishing composition can comprise about 1000 ppm or less of the aromatic carboxylic acid or heteroaromatic carboxylic acid, for example, about 900 ppm or less, about 800 ppm or less, about 700 ppm or less, about 600 ppm or less, or about 500 ppm or less. Alternatively, or in addition, the polishing composition can comprise about 1 ppm or more of the aromatic carboxylic acid or heteroaromatic carboxylic acid, for example, about 50 ppm or more, about 100 ppm or more, about 200 ppm or more, about 300 ppm or more, or about 400 ppm or more. Thus, the aromatic carboxylic acid or heteroaromatic carboxylic acid can be present in the polishing composition in an amount bounded by any two of the aforementioned endpoints. For example, the polishing composition can comprise about 1 ppm to about 500 ppm of the aromatic carboxylic acid or heteroaromatic carboxylic acid, for example, about 50 ppm to about 500 ppm, about 100 ppm to about 500 ppm, about 200 ppm to about 500 ppm, about 300 ppm to about 500 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1000 ppm, or about 1 ppm to about 1000 ppm.

The polishing composition can have any suitable pH. Typically, the polishing composition has a pH of about 2 or more, e.g., about 2.5 or more, about 3 or more, about 3.5 or more, about 4 or more, or about 4.5 or more. Alternatively, or in addition, the polishing composition can have a pH of about 7 or less, e.g., about 6.5 or less, about 6 or less, about 5.5 or less, or about 5 or less. Thus, the polishing composition can have a pH bounded by any two of the above endpoints. For example the polishing composition can have a pH of about 2 to about 7, e.g., about 2.5 to about 7, about 3 to about 7, about 3.5 to about 7, about 4 to about 7, about 4.5 to about 7, about 2.5 to about 6.5, about 2.5 to about 6, about 2.5 to about 5.5, about 2.5 to about 5, about 3 to about 6.5, about 3 to about 6, about 3 to about 5, or about 3.5 to about 5.5.

The pH of the polishing composition can be adjusted using any suitable acid or base. Non-limiting examples of suitable acids include nitric acid, sulfuric acid, phosphoric acid, and organic acids such as acetic acid. Non-limiting examples of suitable bases include sodium hydroxide, potassium hydroxide, and ammonium hydroxide, and organic bases such as ethanolamine, diethanolamine, and triethanolamine.

The chemical-mechanical polishing composition optionally further comprises one or more additives. Illustrative additives include conditioners, acids (e.g., sulfonic acids), complexing agents (e.g., anionic polymeric complexing agents), chelating agents, biocides, scale inhibitors, dispersants, etc.

The polishing composition can be free or substantially free of an oxidizing agent that oxidizes a metal. As used herein, the phrase "free of oxidizing agent" means that the polishing composition includes no more than trace contaminant amounts of oxidizing materials, which amounts are insufficient to affect any metal removal rate obtainable with the composition during CMP. As used herein, "substantially free of an oxidizing agent" means less than 1 wt. % of an oxidizing agent, preferably, less than 0.1 wt. % of an oxidizing agent, and more preferably, less than 0.01 wt. % of an oxidizing agent. In a particular embodiment, the polishing composition is free or substantially free of hydrogen peroxide, ferric nitrate, potassium iodate, peracetic acid, and potassium permanganate.

The polishing composition is stable for an extended period of time. For example, the polishing composition is stable for longer than about two weeks. Preferably, the polishing composition is stable for longer than about four weeks. More preferably, the polishing composition is stable for longer than about six weeks. As used herein, "stable" refers to any kind of stability. For example, stable can refer to colloidal stability, composition stability, and performance stability (i.e., producing repetitive results).

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., wet-process ceria, surfactant, aromatic carboxylic acid or heteroaromatic carboxylic acid, optional pH adjustor, etc.) as well as any combination of ingredients (e.g., wet-process ceria, surfactant, aromatic carboxylic acid or heteroaromatic carboxylic acid, optional pH adjustor, etc.).

For example, the wet-process ceria can be dispersed in water. The surfactant and aromatic carboxylic acid or heteroaromatic carboxylic acid can then be added and mixed by any method that is capable of incorporating the components into the polishing composition. The polishing composition also can be prepared by mixing the components at the surface of the substrate during the polishing operation.

The polishing composition can be supplied as a one-package system comprising wet-process ceria, surfactant, aromatic carboxylic acid or heteroaromatic carboxylic acid, optional pH adjustor, and water. Alternatively, the wet-process ceria can be supplied as a dispersion in water in a first container, and the surfactant, aromatic carboxylic acid or heteroaromatic carboxylic acid, and optional pH adjustor can be supplied in a second container, either in dry form, or as a solution or dispersion in water, to form an additive solution. The components in the first or second container can be in dry form while the components in the other container can be in the form of an aqueous dispersion. Moreover, it is suitable for the components in the first and second containers to have different pH values, or alternatively to have substantially similar, or even equal, pH values. Other two-container, or three or more-container, combinations of the components of the polishing composition are within the knowledge of one of ordinary skill in the art.

Various methods can be employed to utilize such a two-package polishing system. For example, the cerium oxide slurry and additive solution can be delivered to the polishing table by different pipes that are joined and connected at the outlet of supply piping. The cerium oxide slurry and additive solution can be mixed shortly or immediately before polishing, or can be supplied simultaneously on the polishing table. Furthermore, when mixing the two packages, deionized water can be added, as desired, to adjust the polishing composition and resulting substrate polishing characteristics.

The polishing composition of the invention also can be provided as a concentrate which is intended to be diluted with an appropriate amount of water prior to use. In such an embodiment, the polishing composition concentrate can comprise the wet-process ceria, surfactant, aromatic carboxylic acid or heteroaromatic carboxylic acid and optional pH adjustor, in amounts such that, upon dilution of the concentrate with an appropriate amount of water, each component of the polishing composition will be present in the polishing composition in an amount within the appropriate range recited above for each component. For example, the wet-process ceria, surfactant, aromatic carboxylic acid or heteroaromatic carboxylic acid, and optional pH adjustor can each be present in the polishing composition in an amount that is about 2 times (e.g., about 3 times, about 4 times, or about 5 times) greater than the concentration recited above for each component so that, when the concentrate is diluted with an equal volume of water (e.g., 2 equal volumes of water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that other components are at least partially or fully dissolved in the concentrate.

The invention also provides a method of chemically mechanically polishing a substrate comprising (i) providing a substrate, (ii) providing a polishing pad, (iii) providing a chemical-mechanical polishing composition comprising (a) wet-process ceria, (b) a surfactant comprising an amine-containing anchor group and ethylene oxide-propylene oxide stabilizing group, wherein the surfactant has a molecular weight of from about 1000 Daltons to about 5000 Daltons, (c) an aromatic carboxylic acid or heteroaromatic carboxylic acid, and (d) water, wherein the polishing composition has a pH of about 3 to about 6, (iv) contacting the substrate with the polishing pad and the chemical-mechanical polishing composition, and (v) moving the polishing pad and the chemical-mechanical polishing composition relative to the substrate to abrade at least a portion of a surface of the substrate to polish the substrate.

The substrate to be polished using the method of the invention can be any suitable substrate. Suitable substrates include, but are not limited to, flat panel displays, integrated circuits, memory or rigid disks, metals, semiconductors, inter-layer dielectric (ILD) devices, microelectromechanical systems (MEMS), ferroelectrics, and magnetic heads. The polishing composition is particularly well-suited for planarizing or polishing a substrate that has undergone shallow trench isolation (STI) processing. The substrate can further comprise at least one other layer, e.g., an insulating layer. The insulating layer can be a metal oxide, porous metal oxide, glass, organic polymer, fluorinated organic polymer, or any other suitable high or low-κ insulating layer. The insulating layer can comprise, consist essentially of, or consist of silicon oxide, silicon nitride, or combinations thereof. The silicon oxide layer can comprise, consist essentially of, or consist of any suitable silicon oxide, many of which are known in the art. For example, the silicon oxide layer can comprise tetraethoxysilane (TEOS), high density plasma (HDP) oxide, borophosphosilicate glass (BPSG), high aspect ratio process (HARP) oxide, spin on dielectric (SOD) oxide, chemical vapor deposition (CVD) oxide, plasma-enhanced tetraethyl orthosilicate (PETEOS), thermal oxide, or undoped silicate glass. The substrate can further comprise a metal layer. The metal can comprise, consist essentially of, or consist of any suitable metal, many of which are known in the art, such as, for example, copper, tantalum, tungsten, titanium, platinum, ruthenium, iridium, aluminum, nickel, or combinations thereof.

The invention is exemplified by the following embodiments:

(1) In embodiment (1) is presented a chemical-mechanical polishing composition comprising:
(a) wet-process ceria abrasive,
(b) a surfactant comprising an amine-containing anchor group and ethylene oxide-propylene oxide stabilizing group, wherein the surfactant has an average molecular weight of from about 1000 Daltons to about 5000 Daltons,
(c) an aromatic carboxylic acid or heteroaromatic carboxylic acid, and
(d) water,
wherein the polishing composition has a pH of about 3 to about 6.

(2) In embodiment (2) is presented the polishing composition of embodiment (1), wherein the wet-process ceria abrasive is present in the polishing composition in an amount of from about 0.05 wt. % to about 2 wt. %.

(3) In embodiment (3) is presented the polishing composition of embodiment (1) or (2), wherein the surfactant is a cationic comb polymer comprising an amine-containing anchor group of the formula:

wherein Ar is a 1,4-disubstituted arylene or and n is an integer of from about 2 to about 10.

(4) In embodiment (4) is presented the polishing composition of embodiment (3), wherein the ethylene oxide-propylene oxide stabilizing group has the formula: —(CH(CH$_3$)CH$_2$O)$_x$(CH$_2$CH$_2$O)$_y$CH$_3$ wherein x and y are independently selected integers of from about 2 to about 25.

(5) In embodiment (5) is presented the polishing composition of embodiment (1) or (2), wherein the surfactant comprises one mono((diethylamino)alkyl) ether anchor group and one ethylene oxide-propylene oxide stabilizing group of the formula:

(6) In embodiment (6) is presented the polishing composition of embodiment (5), wherein the ethylene oxide-propylene oxide stabilizing group has the formula: —C$_2$H$_4$(OCH$_2$CH$_2$)$_x$(OCH(CH$_3$)CH$_2$)$_y$OH wherein x and y are independently selected integers of from about 2 to about 25.

(7) In embodiment (7) is presented the polishing composition of embodiment (6), wherein the ethylene oxide-propylene oxide stabilizing group has a ratio of ethylene oxide units to propylene oxide units of about 1:1 to about 1:3.

(8) In embodiment (8) is presented the polishing composition of any one of embodiments (1)-(7), wherein the surfactant is present in the polishing composition in an amount of about 10 ppm to about 500 ppm.

(9) In embodiment (9) is presented the polishing composition of any one of embodiments (1)-(8), wherein the aromatic carboxylic acid or heteroaromatic carboxylic acid is picolinic acid.

(10) In embodiment (10) is presented a method of chemically mechanically polishing a substrate comprising:

(i) providing a substrate, (ii) providing a polishing pad, (iii) providing a chemical-mechanical polishing composition comprising:

(a) wet-process ceria, (b) a surfactant comprising an amine-containing anchor group and ethylene oxide-propylene oxide stabilizing group, wherein the surfactant has an average molecular weight of from about 1000 Daltons to about 5000 Daltons, (c) an aromatic carboxylic acid or heteroaromatic carboxylic acid, and (d) water, wherein the polishing composition has a pH of about 3 to about 6, (iv) contacting the substrate with the polishing pad and the chemical-mechanical polishing composition, and (v) moving the polishing pad and the chemical-mechanical polishing composition relative to the substrate to abrade at least a portion of a surface of the substrate to polish the substrate.

EXAMPLES

The following examples further illustrate the invention but, of course, should not be construed as in any way limiting its scope.

Patterned wafers used in the Examples comprised a blanket layer of TEOS deposited over a patterned silicon substrate having lines etched into the surface thereof. The substrates are referred to herein as having either (1) a 900 μm×900 μm pattern wherein the width of the "up" regions of the surface lying over the unetched regions of the substrate was 900 μm, and the width of the "down" regions of the surface lying over the lines was 900 μm, or (2) a 10 mm×10 mm pattern wherein the width of the "up" regions of the surface lying over the unetched regions of the substrate was 10 mm, and the width of the "down" regions of the surface lying over the lines was 10 mm, unless otherwise specified. Remaining step height refers to the thickness of TEOS lying over the unetched regions of the surface. Trench loss is a measurement relating to the removal of TEOS within the lines and between the up regions.

Example 1

This example demonstrates the effect of a surfactant additive on the TEOS planarization efficiency exhibited by a polishing composition comprising wet-process ceria.

Substrates comprising a layer of TEOS on a 900 μm×900 μm patterned silicon coupon were polished with an IC1010 pad using two different polishing compositions, Polishing Composition 1A ("PC1A") and Polishing Composition 1B ("PC1B"). Each of Polishing Compositions 1A and 1B comprised 0.286 wt. % of wet-process ceria and 500 ppm of picolinic acid in water, with the pH adjusted to 4.0 using triethanolamine or acetic acid, as necessary. Polishing Composition 1A (control) did not further contain a surfactant. Polishing Composition 1B (invention) further contained 25 ppm Jeffsperse™ X3503 (Huntsman Corp., Woodlands, Tex.). The substrates were polished on a 200 mm Mirra™ polishing tool (Applied Materials, Santa Clara, Calif.).

Following polishing, the TEOS removal rates were determined, and the remaining step height and trench loss were measured. The results are set forth in Table 1 and FIG. 2.

TABLE 1

Trench Loss and Step Height as a Function of Surfactant for STI 10k TEOS Wafers

| Polishing Composition | Polishing Time (s) | Trench Loss (Å) | Step Height (Å) |
| --- | --- | --- | --- |
| PC1A (Control) | 30 | 798 | 1693 |
| PC1A (Control) | 40 | 1783 | 1020 |
| PC1A (Control) | 45 | 2111 | 892 |
| PC1A (Control) | 50 | 2806 | 633 |
| PC1A (Control) | 50 | 2853 | 577 |
| PC1A (Control) | 55 | 3269 | 451 |
| PC1B (Invention) | 48 | 370 | 1500 |
| PC1B (Invention) | 50 | 587 | 947 |
| PC1B (Invention) | 55 | 661 | 931 |
| PC1B (Invention) | 54 | 925 | 792 |
| PC1B (Invention) | 60 | 1228 | 444 |
| PC1B (Invention) | 70 | 1887 | 232 |

Figure 2:
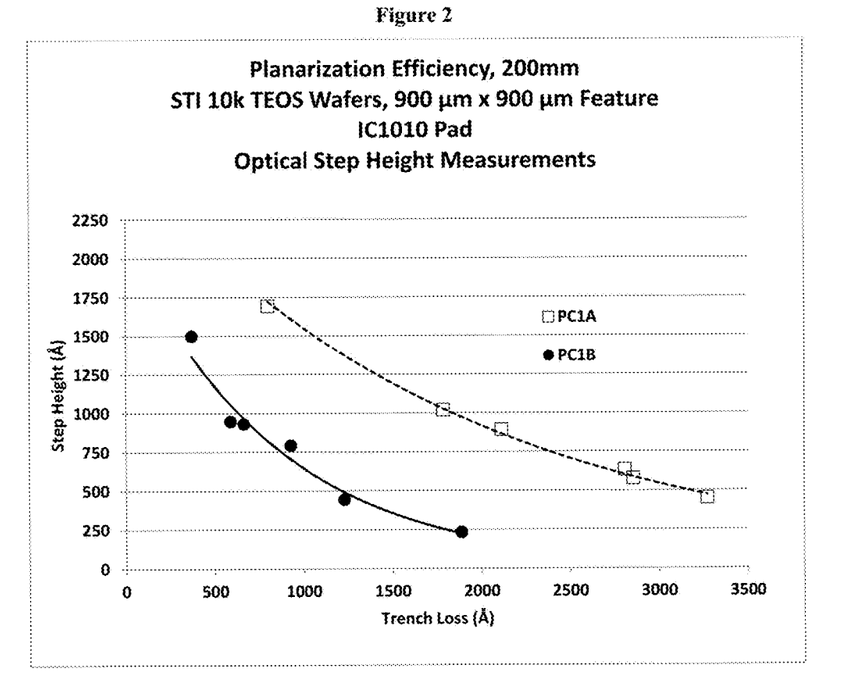
FIG. 2 graphically depicts planarization efficiency, or step height versus trench loss, exhibited by a pair of polishing compositions comprising ceria and optionally Jeffsperse™ X3503, a comb polymer dispersant, in the polishing of a 900 µm×900 µm patterned substrate.

As is apparent from the results set forth in Table 1 and FIG. 2, the use of Polishing Composition 1B, which contained Jeffsperse™ X3503, resulted in less trench loss for a given reduction in step height than did Polishing Composition 1A, which did not contain Jeffsperse™ X3503. In particular, Polishing Composition 1B (invention) exhibited manageable step height removal and significantly diminished trench loss relative to control Polishing Composition 1A.

Example 2

This example demonstrates the effect of a surfactant additive on the TEOS planarization efficiency exhibited by a polishing composition comprising wet-process ceria.

Substrates comprising a layer of TEOS on a 10 mm×10 mm patterned silicon coupon were polished with an R200-01 pad using two different polishing compositions, Polishing Composition 1A (control) and Polishing Composition 1B (invention), as described in Example 1. The substrates were polished on a 200 mm Mirra™ polishing tool (Applied Materials, Santa Clara, Calif.).

Following polishing, the TEOS removal rates were determined, and the remaining step height and trench loss were measured. The results are set forth in Table 2 and FIG. 3.

TABLE 2

Trench Loss and Step Height as a Function of Surfactant for 3D NAND Wafers

| Polishing Composition | Polishing Time (s) | Trench Loss (Å) | Step Height (Å) |
| --- | --- | --- | --- |
| PC1A (Control) | 150 | 2032 | 3946 |
| PC1A (Control) | 130 | 2346 | 4322 |
| PC1A (Control) | 150 | 4101 | 3092 |
| PC1A (Control) | 160 | 4697 | 2467 |
| PC1A (Control) | 160 | 4960 | 2433 |
| PC1A (Control) | 170 | 6383 | 2256 |
| PC1B (Invention) | 175 | 2757 | 2259 |
| PC1B (Invention) | 165 | 2767 | 2483 |
| PC1B (Invention) | 180 | 4216 | 1404 |
| PC1B (Invention) | 185 | 4413 | 1767 |

Figure 3:
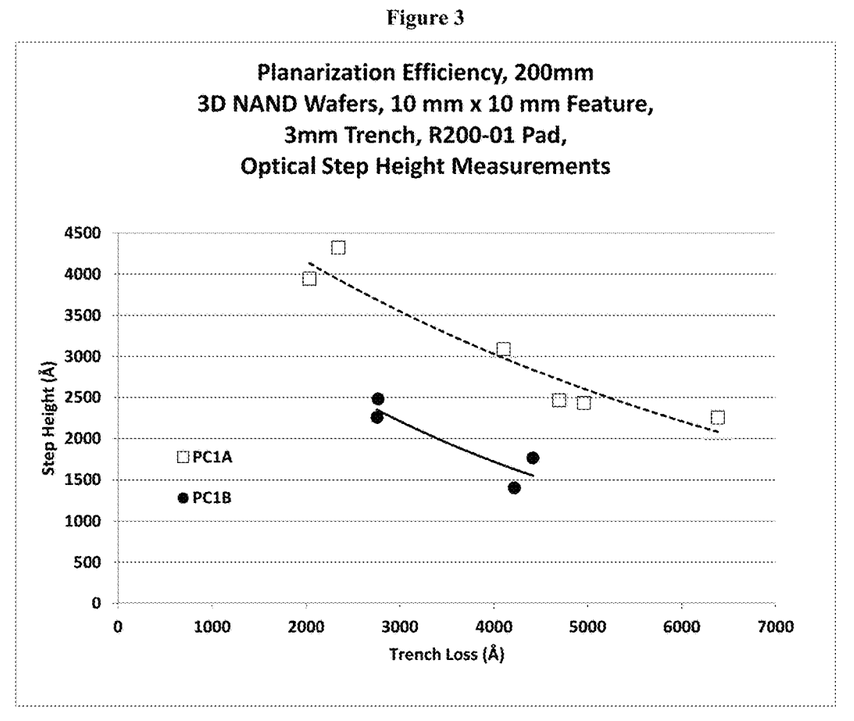
FIG. 3 graphically depicts planarization efficiency, or step height versus trench loss, exhibited by a pair of polishing compositions comprising ceria and optionally Jeffsperse™ X3503, a comb polymer dispersant, in the polishing of a 10 mm×10 mm patterned substrate.

As is apparent from the results set forth in Table 2 and FIG. 3, Polishing Composition 1B (invention), containing Jeffsperse™ X3503, demonstrated a significant improvement in TEOS planarization efficiency, relative to control Polishing Composition 1A.

Example 3

This example demonstrates the stability and longevity of a polishing composition containing a surfactant by determining the TEOS planarization efficiency after a six week time period.

Substrates comprising a layer of TEOS on a 900 µm×900 µm patterned silicon coupon were polished with an IC1010 pad using two different polishing compositions, Polishing Composition 1A (control) and Polishing Composition 1B (invention), as described in Example 1. Polishing Composition 1B (invention) was evaluated after being freshly prepared and aged six weeks. The substrates were polished on a 200 mm Mirra™ polishing tool (Applied Materials, Santa Clara, Calif.).

Following polishing, the TEOS removal rates were determined, and the remaining step height and trench loss were measured. The results are set forth in Table 3 and FIG. 4.

TABLE 3

Trench Loss and Step Height as a Function of Surfactant for Freshly Prepared and Aged Polishing Compositions

| Polishing Composition | Polishing Time (s) | Trench Loss (Å) | Step Height (Å) |
| --- | --- | --- | --- |
| PC1A (Control) | 30 | 798 | 1693 |
| PC1A (Control) | 45 | 1712 | 779 |
| PC1A (Control) | 40 | 1721 | 865 |
| PC1A (Control) | 40 | 1783 | 1020 |
| PC1A (Control) | 45 | 1793 | 958 |
| PC1A (Control) | 45 | 1903 | 994 |
| PC1A (Control) | 42 | 1981 | 664 |
| PC1A (Control) | 45 | 2111 | 892 |
| PC1A (Control) | 45 | 2341 | 626 |
| PC1A (Control) | 45 | 2401 | 568 |
| PC1A (Control) | 50 | 2806 | 633 |
| PC1A (Control) | 50 | 2853 | 577 |
| PC1A (Control) | 55 | 3269 | 451 |
| PC1B (Freshly Prepared) | 60 | 949 | 429 |
| PC1B (Six Weeks Old) | 60 | 855 | 506 |

Figure 4:
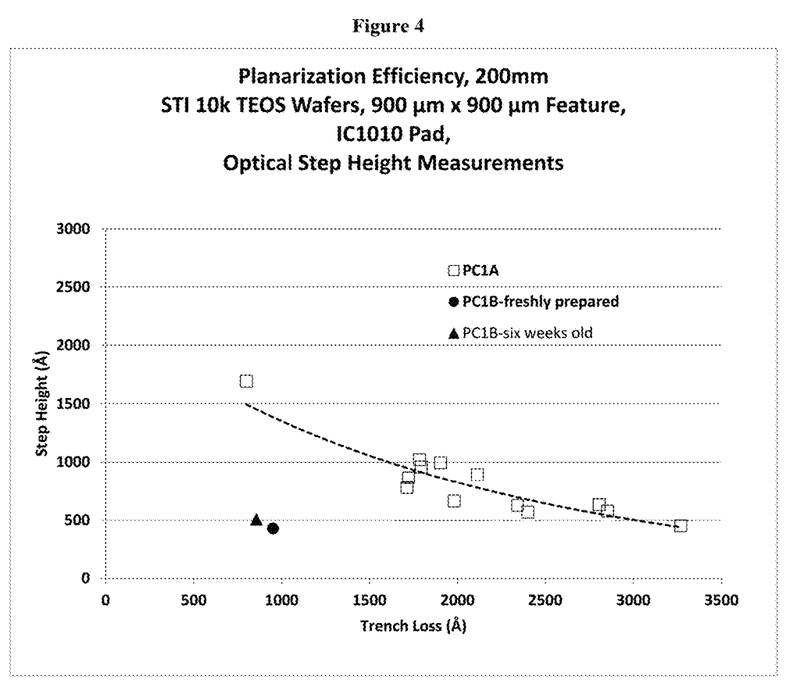
FIG. 4 graphically depicts planarization efficiency, or step height versus trench loss, exhibited by a freshly prepared polishing composition comprising ceria and Jeffsperse™ X3503 and a six week old polishing composition comprising ceria and Jeffsperse™ X3503 in the polishing of a 900 µm×900 µm patterned substrate.

As demonstrated by Table 3 and FIG. 4, both freshly prepared Polishing Composition 1B and six week old Polishing Composition 1B, containing Jeffsperse™ X3503, outperformed control Polishing Composition 1A. In addition, freshly prepared Polishing Composition 1B and six week old Polishing Composition 1B produced similar results, exemplifying the stability and longevity of Polishing Composition 1B.

Example 4

This example demonstrates the effect of a surfactant solution on the TEOS zeta potential.

TEOS wafer sections, comprising pieces cut from a TEOS wafer, were dipped in three separate solutions: Solution 4A ("S4A"), containing no Jeffsperse™ X3503 (Huntsman Corp. Woodlands, Tex.), as a control, Solution 4B ("S4B"), containing 0.6 equivalents of Jeffsperse™ X3503, and Solution 4C ("S4C"), containing one equivalent of Jeffsperse™ X3503. Each solution was maintained at pH value 4.0, and the zeta potential of the wafer surface was measured. The results are set forth in Table 4 and FIG. 5.

TABLE 4

Zeta Potential of TEOS Wafers as a Function of Surfactant

| Solution | TEOS Zeta Potential (mV) |
| --- | --- |
| S4A (No Surfactant Additive) | −24.1 |
| S4B (0.6x Surfactant Additive) | 19.8 |
| S4C (1x Surfactant Additive) | 31.4 |

Figure 5:
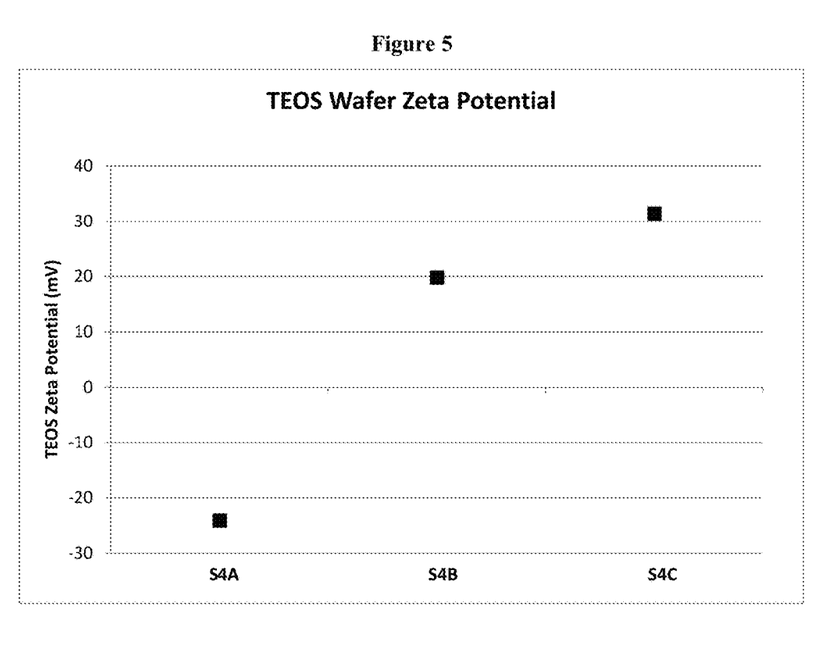
FIG. 5 graphically depicts the zeta potential exhibited by a TEOS wafer dipped in solutions comprising Jeffsperse™ X3503.

As is apparent from the results set forth in Table 4 and FIG. 5, the surface potential of TEOS wafer dipped in control Solution 4A was determined to be −24.1 mV. Addition of one equivalent of Jeffsperse™ X3503 (Solution 4C) results in complete inversion of surface potential to 31.4 mV at a pH value of 4.0.

Example 5

This example demonstrates the effect of a surfactant additive on the TEOS planarization efficiency exhibited by a polishing composition comprising wet-process ceria.

Substrates comprising a layer of TEOS on a 900 µm×900 µm patterned silicon coupon were polished with an IC1010 pad using two different polishing compositions, Polishing Composition 1A ("PC1A"), as described in Example 1, and Polishing Composition 5 ("PC5"). Each of Polishing Compositions 1A and 5 comprised 0.286 wt. % of wet-process ceria and 500 ppm of picolinic acid in water, with the pH adjusted to 4.0 using triethanolamine or acetic acid, as necessary. Polishing Composition 1A (control) did not further contain a surfactant. Polishing Composition 5 (invention) further contained 300 ppm Solsperse™ 20000 Lubrizol Corporation (Wickliffe, Ohio). The substrates were polished on a Reflexion™ LK polishing tool (Applied Materials, Santa Clara, Calif.).

Following polishing, the TEOS removal rates were determined, and the remaining step height and trench loss were measured. The results are set forth in Table 5 and FIG. 6.

TABLE 5

Trench Loss and Step Height as a Function of Surfactant for IC1010 Pad

| Polishing Composition | Polishing Time (s) | Trench Loss (Å) | Step Height (Å) |
| --- | --- | --- | --- |
| PC1A (Control) | 30 | 429 | 1709 |
| PC1A (Control) | 35 | 1673 | 972 |
| PC1A (Control) | 40 | 1721 | 865 |
| PC1A (Control) | 42 | 1705 | 762 |
| PC1A (Control) | 45 | 2341 | 626 |
| PC1A (Control) | 48 | 3427 | 517 |
| PC1A (Control) | 50 | 2680 | 532 |
| PC1A (Control) | 60 | 5126 | 180 |
| PC5 (Invention) | 30 | 142 | 2011 |
| PC5 (Invention) | 35 | 211 | 1730 |
| PC5 (Invention) | 40 | 265 | 1172 |
| PC5 (Invention) | 48 | 725 | 780 |
| PC5 (Invention) | 50 | 678 | 527 |
| PC5 (Invention) | 60 | 1430 | 191 |
| PC5 (Invention) | 60 | 1595 | 297 |

Figure 6:
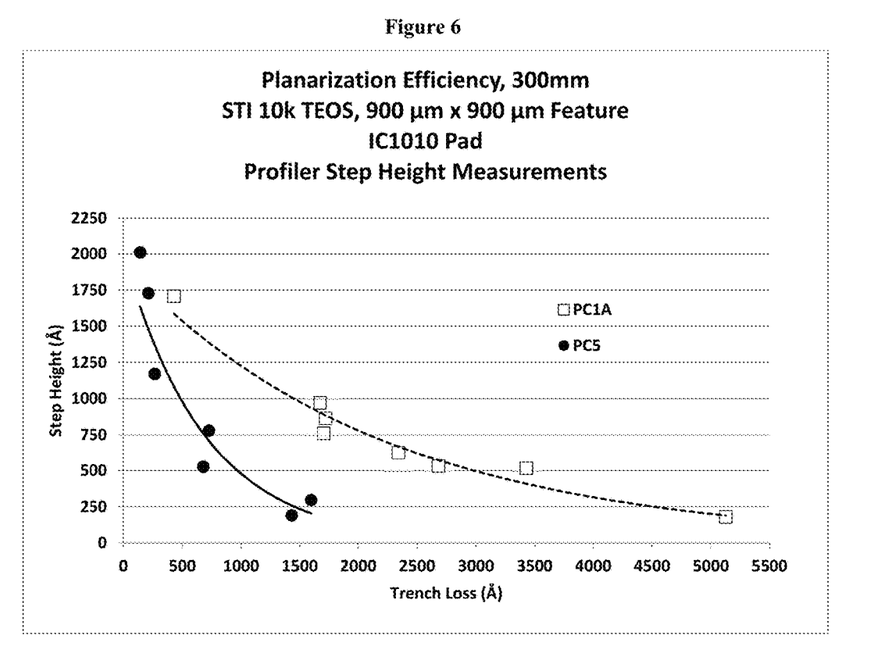
FIG. 6 graphically depicts planarization efficiency, or step height versus trench loss, exhibited by a pair of polishing compositions comprising ceria and optionally Solsperse™ 20000, in the polishing of a 900 µm×900 µm patterned substrate using an IC1010 pad.

As is apparent from the results set forth in Table 5 and FIG. 6, the use of Polishing Composition 5, which contained Solsperse™ 20000, resulted in less trench loss for a given reduction in step height than did Polishing Composition 1A, which did not contain Solsperse™ 20000. In particular, Polishing Composition 5 (invention) exhibited manageable step height removal and significantly diminished trench loss relative to control Polishing Composition 1A.

Example 6

This example demonstrates the effect of a surfactant additive on the TEOS planarization efficiency exhibited by a polishing composition comprising wet-process ceria, using a different polishing pad than used in Example 5.

Substrates comprising a layer of TEOS on a 900 μm×900 μm patterned silicon coupon were polished with an NexPlanar™ E6088 pad using two different polishing compositions, Polishing Composition 1A ("PC1A"), as described in Example 1, and Polishing Composition 5 ("PC5"). Each of Polishing Compositions 1A and 5 comprised 0.286 wt. % of wet-process ceria and 500 ppm of picolinic acid in water, with the pH adjusted to 4.0 using triethanolamine or acetic acid, as necessary. Polishing Composition 1A (control) did not further contain a surfactant. Polishing Composition 5 (invention) further contained 300 ppm Solsperse™ 20000 Lubrizol Corporation (Wickliffe, Ohio). The substrates were polished on a Reflexion™ LK polishing tool (Applied Materials, Santa Clara, Calif.).

Following polishing, the TEOS removal rates were determined, and the remaining step height and trench loss were measured. The results are set forth in Table 6 and FIG. 7.

TABLE 6

Trench Loss and Step Height as a Function of Surfactant for E6088 Pad

| Polishing Composition | Polishing Time (s) | Trench Loss (Å) | Step Height (Å) |
|---|---|---|---|
| PC1A (Control) | 30 | 1241 | 1257 |
| PC1A (Control) | 40 | 2503 | 649 |
| PC1A (Control) | 45 | 2983 | 485 |
| PC1A (Control) | 50 | 4163 | 338 |
| PC5 (Invention) | 35 | 230 | 1408 |
| PC5 (Invention) | 48 | 511 | 833 |
| PC5 (Invention) | 60 | 1350 | 307 |

Figure 7:
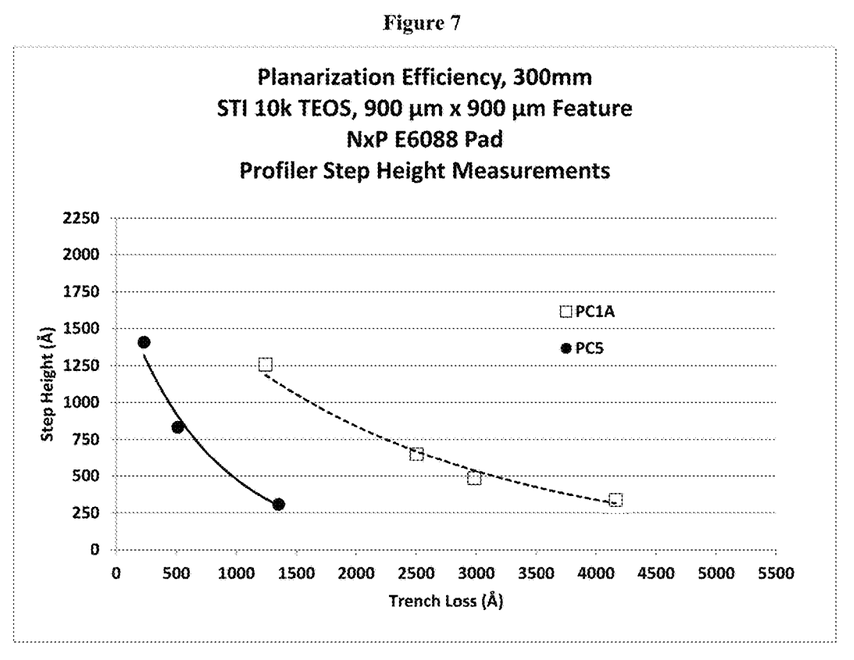
FIG. 7 graphically depicts planarization efficiency, or step height versus trench loss, exhibited by a pair of polishing compositions comprising ceria and optionally Solsperse™ 20000, in the polishing of a 900 µm×900 µm patterned substrate using an NxP E6088 pad.

As is apparent from the results set forth in Table 6 and FIG. 7, the use of Polishing Composition 5, which contained Solsperse™ 20000, resulted in less trench loss for a given reduction in step height than did Polishing Composition 1A, which did not contain Solsperse™ 20000. In particular, Polishing Composition 5 (invention) exhibited manageable step height removal and significantly diminished trench loss relative to control Polishing Composition 1A. Example 6 further demonstrates that Polishing Composition 5 provides improved trench loss and step height removal, relative to the control, for pads of varying composition (i.e., IC1010 pad and NxP E6088 pad).

Example 7

This example demonstrates the effect of a surfactant additive on the TEOS planarization efficiency exhibited by a polishing composition comprising wet-process ceria.

Substrates comprising a layer of TEOS on a 10 mm×5 mm patterned 3D NAND wafer were polished with an IC1010 pad using two different polishing compositions, Polishing Composition 1A ("PC1A"), as described in Example 1, and Polishing Composition 5 ("PC5"). Each of Polishing Compositions 1A and 5 comprised 0.286 wt. % of wet-process ceria and 500 ppm of picolinic acid in water, with the pH adjusted to 4.0 using triethanolamine or acetic acid, as necessary. Polishing Composition 1A (control) did not further contain a surfactant. Polishing Composition 5 (invention) further contained 300 ppm Solsperse™ 20000 Lubrizol Corporation (Wickliffe, Ohio). The substrates were polished on a 200 mm Mirra™ polishing tool (Applied Materials, Santa Clara, Calif.).

Following polishing, the TEOS removal rates were determined, and the remaining step height and trench loss were measured. The results are set forth in Table 7 and FIG. 8.

TABLE 7

Trench Loss and Step Height as a Function of Surfactant for 3D NAND Wafers

| Polishing Composition | Polishing Time (s) | Trench Loss (Å) | Step Height (Å) |
|---|---|---|---|
| PC1A (Control) | 130 | 1886 | 3407 |
| PC1A (Control) | 150 | 4023 | 2188 |
| PC1A (Control) | 150 | 4140 | 2511 |
| PC1A (Control) | 150 | 4584 | 2392 |
| PC1A (Control) | 170 | 6220 | 1380 |
| PC5 (Invention) | 170 | 1729 | 2828 |
| PC5 (Invention) | 200 | 3511 | 1402 |

Figure 8:
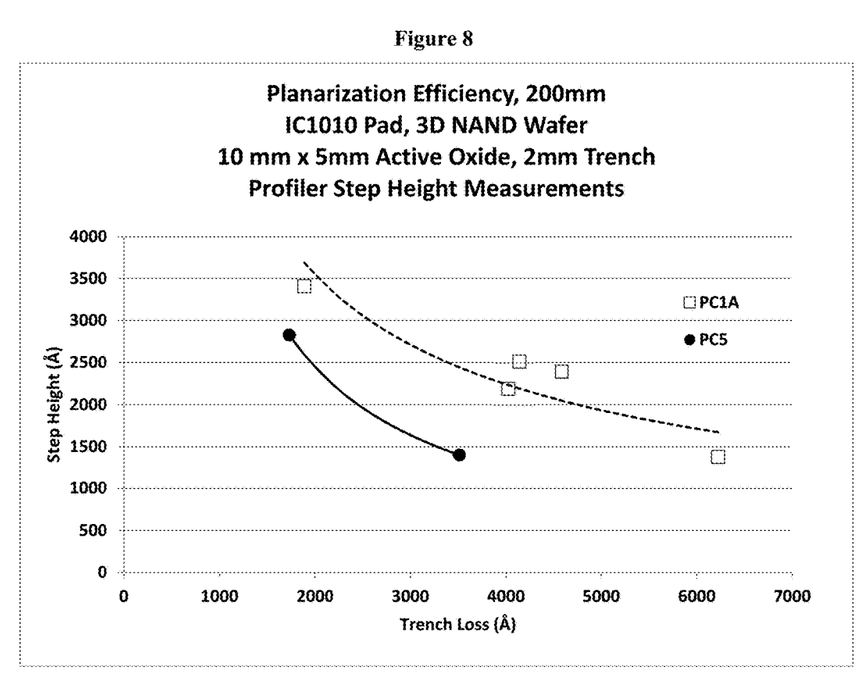
FIG. 8 graphically depicts planarization efficiency, or step height versus trench loss, exhibited by a pair of polishing compositions comprising ceria and optionally Solsperse™ 20000, in the polishing of a 3D NAND wafer using an IC1010 pad.

As is apparent from the results set forth in Table 7 and FIG. 8, the use of Polishing Composition 5, which contained Solsperse™ 20000, resulted in less trench loss for a given reduction in step height than did Polishing Composition 1A, which did not contain Solsperse™ 20000. In particular, Polishing Composition 5 (invention) exhibited manageable step height removal and significantly diminished trench loss relative to control Polishing Composition 1A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) wet-process ceria abrasive,
   (b) a surfactant comprising an amine-containing anchor group and ethylene oxide-propylene oxide stabilizing group, wherein the surfactant has an average molecular weight of from about 1000 Daltons to about 5000 Daltons,
   (c) an aromatic carboxylic acid or heteroaromatic carboxylic acid, and
   (d) water,
   wherein the polishing composition has a pH of about 3 to about 6.

2. The polishing composition of claim 1, wherein the wet-process ceria abrasive is present in the polishing composition in an amount of from about 0.05 wt. % to about 2 wt. %.

3. The polishing composition of claim 1, wherein the surfactant is a cationic comb polymer comprising an amine-containing anchor group of the formula:

wherein Ar is a 1,4-disubstituted arylene or and n is an integer of from about 2 to about 10.

4. The polishing composition of claim 3, wherein the ethylene oxide-propylene oxide stabilizing group has the formula: —(CH(CH$_3$)CH$_2$O)$_x$(CH$_2$CH$_2$O)$_y$CH$_3$ wherein x and y are independently selected integers of from about 2 to about 25.

5. The polishing composition of claim 1, wherein the surfactant comprises one mono((diethylamino)alkyl) ether anchor group and one ethylene oxide-propylene oxide stabilizing group of the formula:

6. The polishing composition of claim 5, wherein the ethylene oxide-propylene oxide stabilizing group has the formula: —C$_2$H$_4$(OCH$_2$CH$_2$)$_x$(OCH(CH$_3$)CH$_2$)$_y$OH wherein x and y are independently selected integers of from about 2 to about 25.

7. The polishing composition of claim 6, wherein the ethylene oxide-propylene oxide stabilizing group has a ratio of ethylene oxide units to propylene oxide units of about 1:1 to about 1:3.

8. The polishing composition of claim 1, wherein the surfactant is present in the polishing composition in an amount of about 10 ppm to about 500 ppm.

9. The polishing composition of claim 1, wherein the aromatic carboxylic acid or heteroaromatic carboxylic acid is picolinic acid.

10. A method of chemically mechanically polishing a substrate comprising:
   (i) providing a substrate,
   (ii) providing a polishing pad,
   (iii) providing a chemical-mechanical polishing composition comprising:
      (a) wet-process ceria,
      (b) a surfactant comprising an amine-containing anchor group and ethylene oxide-propylene oxide stabilizing group, wherein the surfactant has an average molecular weight of from about 1000 Daltons to about 5000 Daltons,
      (c) an aromatic carboxylic acid or heteroaromatic carboxylic acid, and
      (d) water,
   wherein the polishing composition has a pH of about 3 to about 6,
   (iv) contacting the substrate with the polishing pad and the chemical-mechanical polishing composition, and
   (v) moving the polishing pad and the chemical-mechanical polishing composition relative to the substrate to abrade at least a portion of a surface of the substrate to polish the substrate.

11. The method of claim 10, wherein the wet-process ceria abrasive is present in the polishing composition in an amount of from about 0.05 wt. % to about 2 wt. %.

12. The method of claim 10, wherein the surfactant is a cationic comb polymer comprising an amine-containing anchor group of the formula:

wherein Ar is a 1,4-disubstituted arylene or and n is an integer of from about 2 to about 10.

13. The method of claim 12, wherein the ethylene oxide-propylene oxide stabilizing group has the formula: —(CH(CH$_3$)CH$_2$O)$_x$(CH$_2$CH$_2$O)$_y$CH$_3$ wherein x and y are independently selected integers of from about 2 to about 25.

14. The method of claim 10, wherein the surfactant comprises one mono((diethylamino)alkyl) ether anchor group and one ethylene oxide-propylene oxide stabilizing group of the formula:

15. The method of claim 14, wherein the ethylene oxide-propylene oxide stabilizing group has the formula: —C$_2$H$_4$(OCH$_2$CH$_2$)$_x$(OCH(CH$_3$)CH$_2$)$_y$OH wherein x and y are independently selected integers of from about 2 to about 25.

16. The method of claim 15, wherein the ethylene oxide-propylene oxide stabilizing group has a ratio of ethylene oxide units to propylene oxide units of about 1:1 to about 1:3.

17. The method of claim 10, wherein the surfactant is present in the polishing composition in an amount of about 10 ppm to about 500 ppm.

18. The method of claim 10, wherein the aromatic carboxylic acid or heteroaromatic carboxylic acid is picolinic acid.

19. The method of claim 10, wherein the substrate comprises silicon oxide, and wherein at least a portion of the silicon oxide is removed from the substrate to polish the substrate.

* * * * *